United States Patent
Bardainne

(10) Patent No.: US 10,338,245 B2
(45) Date of Patent: Jul. 2, 2019

(54) METHODS AND SYSTEMS OF DETECTING A MICROSEISMIC EVENT USING AN ITERATIVE NON-LINEAR INVERSION ALGORITHM

(71) Applicant: CGG Services SA, Massy (FR)

(72) Inventor: Thomas Bardainne, Massy (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/101,549

(22) PCT Filed: Dec. 4, 2014

(86) PCT No.: PCT/IB2014/003042
§ 371 (c)(1),
(2) Date: Jun. 3, 2016

(87) PCT Pub. No.: WO2015/083000
PCT Pub. Date: Jun. 11, 2015

(65) Prior Publication Data
US 2017/0248717 A1    Aug. 31, 2017

Related U.S. Application Data

(60) Provisional application No. 61/912,071, filed on Dec. 5, 2013.

(51) Int. Cl.
  *G01V 1/28* (2006.01)
  *G01V 1/36* (2006.01)
(52) U.S. Cl.
  CPC ............ *G01V 1/288* (2013.01); *G01V 1/362* (2013.01); *G01V 2210/123* (2013.01)
(58) Field of Classification Search
  CPC ... G01V 1/288; G01V 1/362; G01V 2210/123
  See application file for complete search history.

(56) References Cited

U.S. PATENT DOCUMENTS

| 4,596,005 A * | 6/1986 | Frasier | G01V 1/286 367/38 |
| 4,597,066 A * | 6/1986 | Frasier | G01V 1/286 367/38 |

(Continued)

FOREIGN PATENT DOCUMENTS

WO    2011/022198    2/2011    ........... G01V 1/00

OTHER PUBLICATIONS

International Search Report and Written Opinion, Application No. PCT/IB2014/003042, 11 pages, dated Aug. 5, 2015.

(Continued)

*Primary Examiner* — Jarrett J Stark
(74) *Attorney, Agent, or Firm* — Patent Portfolio Builders PLLC

(57) ABSTRACT

The present disclosure includes a method including determining a spatial region for analysis and selecting a segment of time for analysis, analyzing and correcting a plurality of traces from a plurality of receivers using an iterative non-linear inversion algorithm, wherein each iteration of the non-linear algorithm corrects the plurality of traces using at least one set of parameters defining a microseismic event, determining whether a final stack value of the plurality of traces corrected based on the at least one set of parameters of a final iteration of the iterative non-linear inversion algorithm exceeds a predetermined threshold and upon a determination that the final stack value exceeds the predetermined threshold, detecting a microseismic event defined by the at least one set of parameters of final iteration. The present disclosure also includes associated systems and computer-readable media.

19 Claims, 12 Drawing Sheets

(56) References Cited

U.S. PATENT DOCUMENTS

| | | | | |
|---|---|---|---|---|
| 4,611,311 | A | * | 9/1986 | Frasier .................. G01V 1/286 367/38 |
| 5,073,876 | A | * | 12/1991 | Propes .................. G01V 1/362 367/36 |
| 5,508,914 | A | | 4/1996 | Lee |
| 6,535,818 | B1 | * | 3/2003 | Baeten .................. G01V 1/362 702/17 |
| 6,598,001 | B1 | * | 7/2003 | Deflandre .............. G01V 1/288 367/38 |
| 9,703,006 | B2 | * | 7/2017 | Stern ..................... G01V 11/00 |
| 2005/0088913 | A1 | * | 4/2005 | Lecomte ................ G01V 1/282 367/51 |
| 2011/0444131 | | | 2/2011 | Thornton et al. |
| 2011/0255371 | A1 | * | 10/2011 | Jing ........................ G01V 1/28 367/73 |
| 2012/0253770 | A1 | * | 10/2012 | Stern ..................... G01V 11/00 703/10 |
| 2013/0100770 | A1 | * | 4/2013 | Diller .................... G01V 1/288 367/38 |
| 2013/0215712 | A1 | * | 8/2013 | Geiser ................... G01V 1/288 367/9 |
| 2014/0278120 | A1 | * | 9/2014 | Kahn ..................... G01V 1/282 702/18 |
| 2015/0177400 | A1 | * | 6/2015 | Ozbek ................... G01V 1/003 367/7 |
| 2015/0185344 | A1 | * | 7/2015 | Bardainne .............. G01V 1/30 702/14 |
| 2015/0316669 | A1 | * | 11/2015 | Probert ................. G01V 1/303 702/6 |

OTHER PUBLICATIONS

Hom Nath Gharti et al., "Automated Microearthquake Location Using Envelope Stacking and Robust Global Optimization," Geophysics, Society of Exploration Geophysicists, vol. 75, No. 3, pp. MA27-MA46, Jul. 1, 2010.

Honn Kao et al., "The Source-Scanning Algorithm: Mapping the Distribution of Seismic Sources in Time and Space," Geophysical Journal International, vol. 157, No. 2, pp. 589-594, Apr. 1, 2004.

R. Macault et al., "Enhancement of Microseismic Events Detection Sensitivity by Taking Into Account Focal Mechanism Effects," Geoconvention 2014, pp. 1-5, May 12, 2014.

Nicholas Metropolis et al., "The Monte Carlo Method," Journal of the American Statistical Association, vol. 44, No. 247, pp. 335-341, Sep. 1949.

Malcolm Sambridge, "A Parallel Tempering Algorithm for Probabilistic Sampling and Multimodal Optimization," Geophysical Journal International, 18 pages, Oct. 2013.

Christopher R. Houck, et al., "A Genetic Algorithm for Function Optimization: A Matlab Implementation," NCSU-IE Technical Report 95-09, North Carolina State University, Raleigh, NC, 1995.

A.S. Fraser, "Simulation of Genetic Systems by Automatic Digital Computers, VI. Epistasis," Australian. Journal of Biological Sciences, vol. 13, No. 2, pp. 150-162, 1960.

Xiaorong Xie, "Genetic Algorithm and Simulated Annealing: A Combined Intelligent Optimization Method and Its Application to Subsynchronous Damping Control in Electrical Power Transmission Systems," Intech, Chapter 12, pp. 245-270, 2012.

S. Kirkpatrick, et al., "Optimization by Simulated Annealing," Science, vol. 220, No. 4598, pp. 671-680, May 13, 1983.

\* cited by examiner

METHODS AND SYSTEMS OF DETECTING A MICROSEISMIC EVENT USING AN ITERATIVE NON-LINEAR INVERSION ALGORITHM

CROSS-REFERENCE TO RELATED APPLICATIONS

This application is a U.S. National Stage Application of International Application No. PCT/IB2014/003042 filed Dec. 4, 2014, which designates the United States, and which claims the benefit under 35 U.S.C. § 119(e) of U.S. Provisional Application Ser. No. 61/912,071 filed on Dec. 5, 2013, which are incorporated by reference in their entirety for all purposes.

TECHNICAL FIELD OF THE DISCLOSURE

This disclosure relates generally to seismic analysis, and in particular, to methods and systems for detecting, locating and characterizing a microseismic event using an iterative non-linear inversion algorithm.

BACKGROUND

Seismic surveying or seismic exploration, whether on land or at sea, is accomplished by observing a seismic energy signal that propagates through the Earth. Propagating seismic energy is partially reflected, refracted, diffracted and otherwise affected by one or more geologic structures within the Earth, for example, by interfaces between underground formations having varying acoustic impedances. The affected seismic energy is detected by receivers, or seismic detectors, placed at or near the Earth's surface, in a body of water, or down hole in a wellbore. The resulting signals are recorded and processed to generate information relating to the physical properties of subsurface formations. Some seismic exploration or monitoring may be done passively, or in other words, without generating a seismic energy signal explicitly for the purpose of recording the response. One example of passive seismic monitoring includes monitoring for seismic waves associated with microseismic events. In addition to naturally induced microseismic event, microseismic events may be caused by human operations. This may include any circumstance in which human action changes the stress fields within geological structures in the Earth. Some examples include hydraulic fracturing (sometimes referred to as hydrofracturing or "fracking"), perforation shots, string shots, damming a water flow (like a river or stream), heating the ground, cooling the ground, mining, downhole events like drilling, injecting water or other liquid to displace oil or gas, and the discharge of downhole explosives.

Microseismic events generate P-waves and S-waves, which are received at receivers. A P-wave is an elastic body wave or sound wave in which particles oscillate in the direction the wave propagates. P-waves incident on an interface at other than normal incidence can produce reflected and transmitted S-waves, otherwise known as converted waves.

An S-wave, generated by most land seismic sources and sometimes as converted P-waves, is an elastic body wave in which particles oscillate perpendicular to the direction in which the wave propagates. S-waves, also known as shear waves, travel more slowly than P-waves and cannot travel through fluids because fluids do not support shear. In some circumstances, S-waves may be converted to P-waves. Recording of S-waves requires receivers coupled to the solid Earth and their interpretation can allow determination of rock properties such as fracture density and orientation, Poisson's ratio, and rock type by cross-plotting P-wave and S-wave velocities and other techniques.

A seismic trace is the seismic data recorded by one channel. The seismic trace represents the response of the elastic wave field to velocity and density contrasts across interfaces of layers of rock or sediments as energy travels from the seismic source through the subsurface to a receiver or receiver array. Further, a seismic inversion is a process of transforming seismic data into a quantitative property description of a strata description of an underground location, a focal mechanism, a seismic event location, or other desirable information.

Active and passive seismic monitoring are sometimes done over time, or in other words, in four dimensions (4D). In addition to an image of subsurface formations, 4D monitoring can provide information as to how seismic waves interact with those formations over time, or how the subsurface formations and their contents may change over time. For example, as a producing well is depleted, the introduction of water to displace oil or gas may cause a change in the way seismic waves interact with the subsurface formations. As another example, fractures are formed during hydraulic-fracturing and the progress and quantity of these fractures can be monitored over time. These fractures occur along a fault plane.

The passive monitoring of fault planes can be advantageous in a variety of circumstances. For example, passive seismic monitoring can indicate the origin time, location and magnitude of earthquakes. Passive seismic monitoring for microseismic events can be used to estimate the location and orientation of a fault plane where a smaller fracture has occurred. Determining the location and orientation of a fault plane can provide insight into subsurface formations, including potential traps for oil and gas. A fault may move porous reservoir rock like sandstone or limestone against an impermeable seal like shale or salt, and if the fault does not leak, oil or gas can pool in the reservoir rock. Additionally, the formation and propagation of fractures by the creation of small fault planes can be beneficial when monitoring the progress of hydraulic fracturing. By monitoring the formation of faults in hydraulic fracturing, oil and gas workers may know when sufficient fracturing has been completed or whether more fluid needs to be pumped into the fracturing well.

The focal mechanism of a microseismic event describes the inelastic deformation the event causes. The focal mechanism can be described by the moment tensor for the seismic or microseismic event. The moment tensor is a second order symmetrical tensor providing a mathematical representation of the forces generated by the seismic or microseismic event. Determining the moment tensor of a microseismic event may be accomplished by inverting the raw data generated by the microseismic event to determine a simple double couple defined by S ("strike"), D ("dip") and R ("rake").

The focal mechanism also includes two nodal planes. These two planes represent the transition between positive first motions, or compressive forces, and negative first motions, or dilatational forces. For pure double couple events, the two nodal planes are orthogonal. For moment tensors with non-double couple components, the two nodal planes are non-orthogonal.

In some instances, the focal mechanism may be represented more simply by the tensile mechanism described by strike, dip, rake and alpha, the angle that describes the tensile (or aperture) component, or alternatively by a simple double couple described by the strike, dip, and rake of the event. The focal mechanism may also be represented by a combination of the pressure and tension axes.

Data collected during a seismic survey by receivers includes multiple signals or seismic energy waves that are reflected in traces that are gathered, processed, or utilized to generate a model of the subsurface formations or detect a microseismic event. These traces have an amplitude and a polarity that vary at different locations. For example, a microseismic event will generate seismic waves observed on a seismic trace with different polarities and magnitudes depending on the relationship of the location of the sensor and the focal mechanism of the microseismic event. A variety of parameters may be determined from the signals in order to detect a microseismic event. These include position parameters, X and Y (corresponding to east/west and north/south locations) and Z ("depth") as well as focal mechanism parameters, such as S ("strike"), D ("dip"), R ("rake") and T ("alpha, the angle which describes the tensile (or aperture) component"). A given set of parameters suggests a given set of amplitudes and polarities recorded on receivers.

Among all possible location methods of seismic events, some (like beam forming, beam steering, migration, etc.) are based on a stack of signals in order to increase signal to noise ratio, allowing them to locate weak microseismic events, but without taking into account the focal mechanism effect, only the stack of the absolute value or envelope is possible. Using stacks without amplitude assessment, signals, such as the absolute values of traces from multiple receivers, are summed (or "stacked") to increase the stacked trace energy to detect more microseismic events with more accuracy. (FIGS. 1A and 1B.) However, these techniques provide only weak signal enhancement or none whatsoever. Additionally, stacks without amplitude assessment provide insufficient improvement in signal to noise ratio in the stacked values. These problems arise primarily because these techniques either allow signal in traces to cancel out when they have reversed polarities or they allow noise in traces to be amplified even when it has opposite polarities.

SUMMARY

In one embodiment, a method of detecting microseismic events comprises determining a spatial region for analysis and selecting a segment of time for analysis. The method also comprises analyzing and correcting a plurality of traces from a plurality of receivers over the spatial region and over the segment of time using an iterative non-linear inversion algorithm, wherein each iteration of the non-linear algorithm corrects the plurality of traces using at least one set of parameters defining the microseismic event, each set of the at least one set of parameters comprising at least one position and at least one focal mechanism parameter. The method additionally comprises determining whether a final stack value of the plurality of traces corrected based on the at least one set of parameters of a final iteration of the iterative non-linear inversion algorithm exceeds a predetermined threshold and upon a determination that the final stack value exceeds the predetermined threshold, detecting a microseismic event defined by the at least one set of parameters of final iteration.

In another embodiment, a system for detecting a microseismic event comprises a plurality of receivers to monitor for microseismic events, a network communicatively coupled to the plurality of receivers, and a computing unit coupled to the plurality of receivers comprising a processor unit and a memory unit coupled to the processing unit, the memory unit including instructions that, when executed by the processing unit, are configured to determine a spatial region for analysis and select a segment of time for analysis. The instructions are also configured to analyze and correct a plurality of traces from a plurality of receivers over the spatial region and over the segment of time using an iterative non-linear inversion algorithm, wherein each iteration of the non-linear algorithm corrects the plurality of traces using at least one set of parameters defining the microseismic event, each set of the at least one set of parameters comprising at least one position and at least one focal mechanism parameter. The instructions are further configured to determine whether a final stack value of the plurality of traces corrected based on the at least one set of parameters of a final iteration of the iterative non-linear inversion algorithm exceeds a predetermined threshold, and upon a determination that the final stack value exceeds the predetermined threshold, detect a microseismic event defined by the at least one set of parameters of final iteration.

In an additional embodiment, the present disclosure comprises a non-transitory computer-readable medium containing instructions for detecting a microseismic event that, when executed by a processor, are configured to determine a spatial region for analysis and select a segment of time for analysis. The instructions are also configured to analyze and correct a plurality of traces from a plurality of receivers over the spatial region and over the segment of time using an iterative non-linear inversion algorithm, wherein each iteration of the non-linear algorithm corrects the plurality of traces using at least one set of parameters defining the microseismic event, each set of the at least one set of parameters comprising at least one position and at least one focal mechanism parameter. The instructions are further configured to determine whether a final stack value of the plurality of traces corrected based on the at least one set of parameters of a final iteration of the iterative non-linear inversion algorithm exceeds a predetermined threshold, and upon a determination that the final stack value exceeds the predetermined threshold, detect a microseismic event defined by the at least one set of parameters of final iteration.

BRIEF DESCRIPTION OF THE DRAWINGS

For a more complete understanding of the present disclosure and its features, reference is now made to the following description, taken in conjunction with the accompanying drawings, in which like reference numbers indicate like features and wherein:

FIG. 1A shows the raw traces from different receivers; FIG. 1B is a plot of the sum of the absolute value of the traces; FIG. 1C is a plot of the square of the sum of the absolute value of the traces;

FIG. 2A is a plot of the sum of corrected traces from FIG. 1A; FIG. 2B is a plot of the square of the sum of the corrected traces from FIG. 1A;

DETAILED DESCRIPTION

The present disclosure relates to detecting microseismic events. A microseismic event is detected by stacking traces from multiple receivers taking into account the amplitude as compared to focal mechanism before stacking so that traces are aligned. Specifically, the traces are corrected based on a set of position and focal mechanism parameters defining a potential microseismic event. The corrected traces may be stacked to produce a stack value, which is then compared to a predetermined threshold. If the stack value exceeds the predetermined threshold, then a microseismic event is detected. Stacked trace strength or signal to noise ratio may be greatly improved when detecting microseismic events in this manner as compared to stacking absolute values of traces. Additionally, the ability to detect microseismic events may be improved using the methods and systems herein as compared to stacking absolute values of traces. Systems and methods described herein, in some embodiments, may detect microseismic events up to two times smaller than those detectable via stacking absolute values of traces.

Figure 1A:
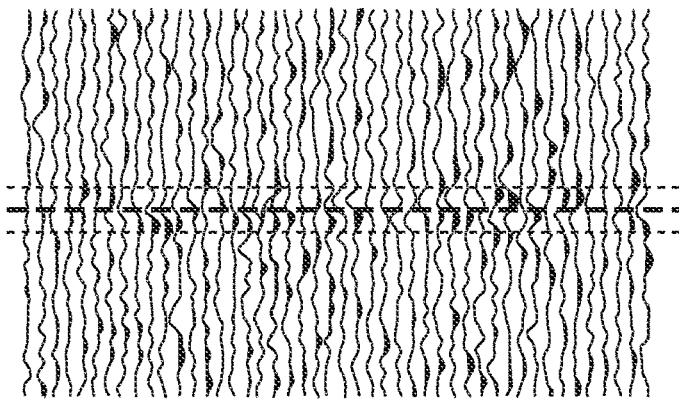
FIGS. 1A-1C illustrate examples of stacking of traces without taking into account the focal mechanism effect and by summing the envelope of traces.
Figure 1B:
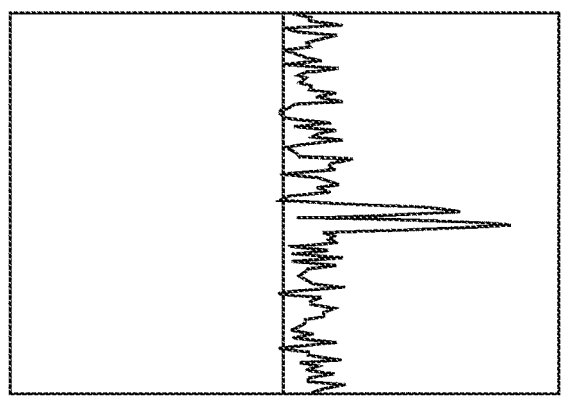

FIG. 1A illustrates an example of raw data from a plurality of receivers. The raw data may represent, by way of example, noise or a signal indicative of a microseismic event. However, the raw data is typically processed to facilitate an understanding of that raw data. For example, as shown in FIG. 1B, the raw data may be stacked to arrive at a single indication of a signal for a given time period or event. In another example, shown in FIG. 1C, the raw data may be squared and then stacked to arrive at a single indication of a signal for a given time period or event.

Figure 1C:
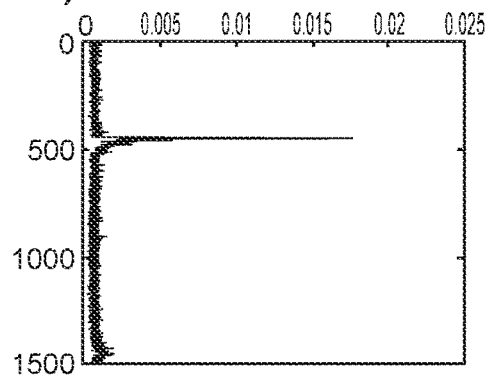
Figure 2A:
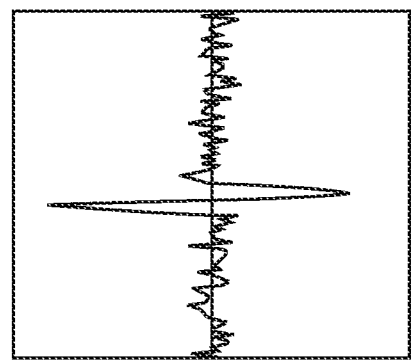
FIGS. 2A-2B illustrate examples of stacking of traces taking into account the focal mechanism effect in accordance with some embodiments of the present disclosure.
Figure 2B:
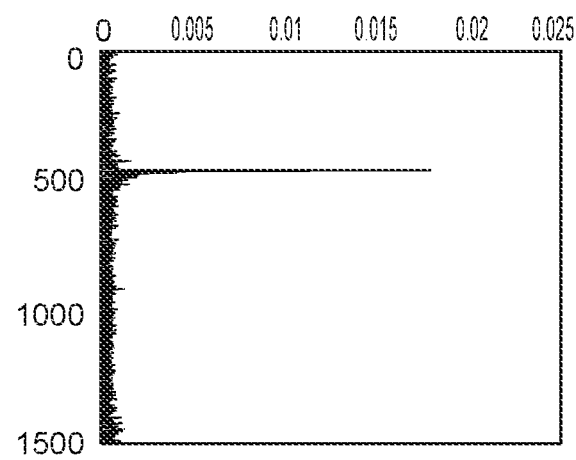

FIG. 2A shows, in contrast to FIG. 1B, the results of stacking corrected raw data from FIG. 1A, while FIG. 2B shows, in contrast to FIG. 1C, the results of stacking the squares of corrected raw data from FIG. 1A. In addition, as can be seen, for example, by comparing FIG. 1C and FIG. 2B, when corrections according to the present disclosure are applied, the maximum signal amplitude remains roughly equivalent to that obtained in when corrections are not applied, but the noise level is lower in FIG. 2B because noise is assigned a proper signed amplitude using embodiments of the present disclosure, instead of simply being summed without any sign correction.

Figure 3:
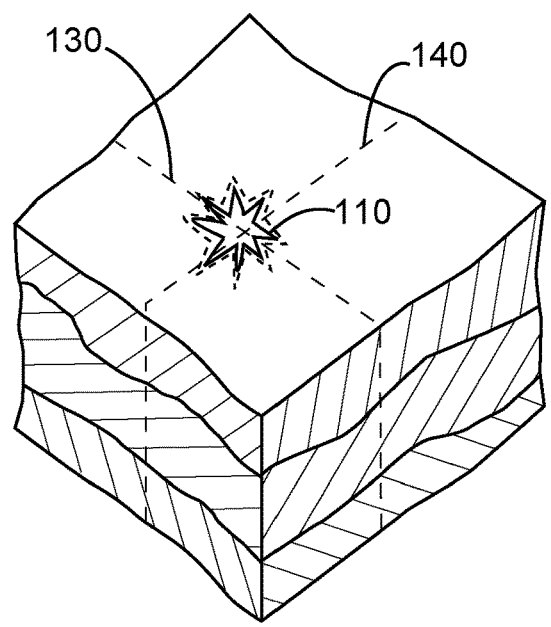
FIG. 3 illustrates an example of a microseismic event and associated X and Y axes, in accordance with some embodiments of the present disclosure.

FIG. 3 illustrates the occurrence of a seismic or microseismic event 110. The event is located along an X (east/west) axis 130 and a Y (north/south) axis 140. The event is also located at a depth Z (not expressly shown).

Figure 4:
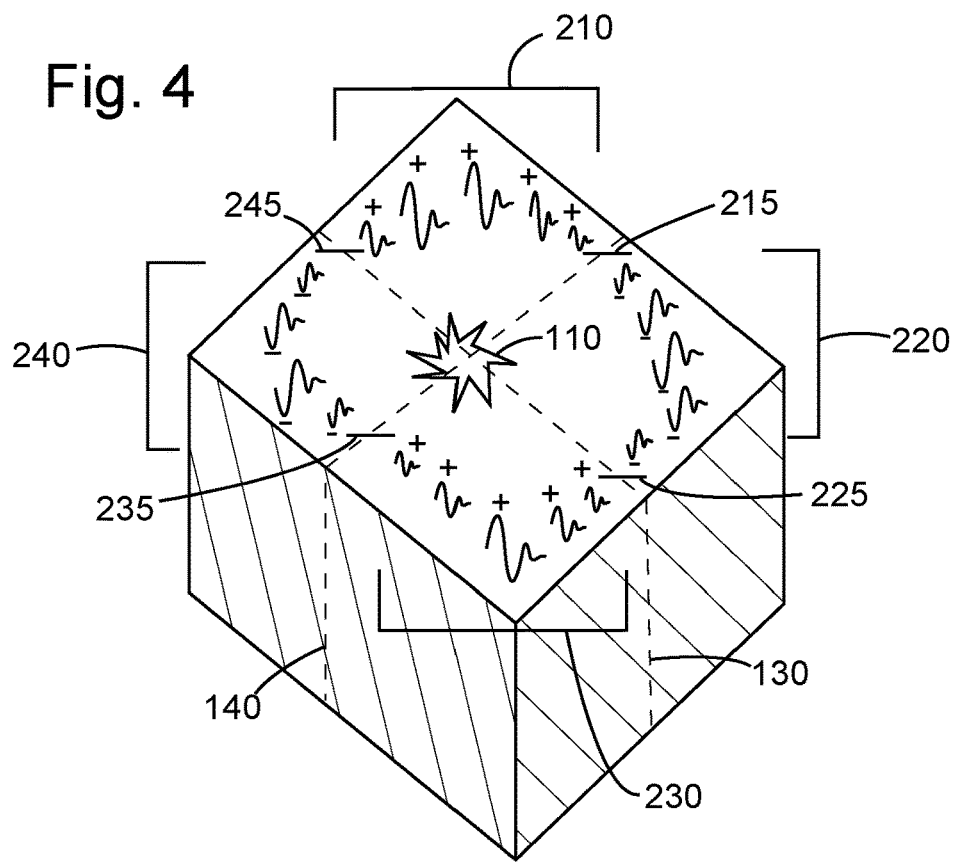
FIG. 4 illustrates an example of the first motions detected in association with a microseismic event, in accordance with some embodiments of the present disclosure.

FIG. 4 illustrates the microseismic event of FIG. 3 with a visual depiction of the positive and negative amplitudes of the first motions detected at a variety of locations around the microseismic event. FIG. 4 also illustrates the X and Y axes. As shown in FIG. 4, traces associated with microseismic event 110 are depicted around microseismic event 110. Each trace shown represents the first motions recorded at a receiver in conjunction with microseismic event 110. As can be seen, there are four quadrants, quadrants 210, 220, 230, and 240, with traces that are detected. In this figure, the X and Y axes also correspond with example orthogonal nodal planes. Accordingly, at the borders of the quadrants are locations where no trace is recorded for the microseismic event, for example, at locations 215, 225, 235 and 245. In quadrants 210 and 230, the first motions have a positive value, and correspond to a dilatational force. At the center of quadrants 210 and 230, the first motions have a maximum amplitude. Proceeding out towards the nodal planes, the trace amplitudes slowly decrease until they cross the threshold into a negative value. In quadrants 220 and 240, the first motions have a negative value, and correspond to a tensile force. Similar to quadrants 210 and 230, at the center of quadrants 220 and 240 the first motions have a maximum amplitude and decrease in magnitude as they approach the nodal planes.

Figure 5:
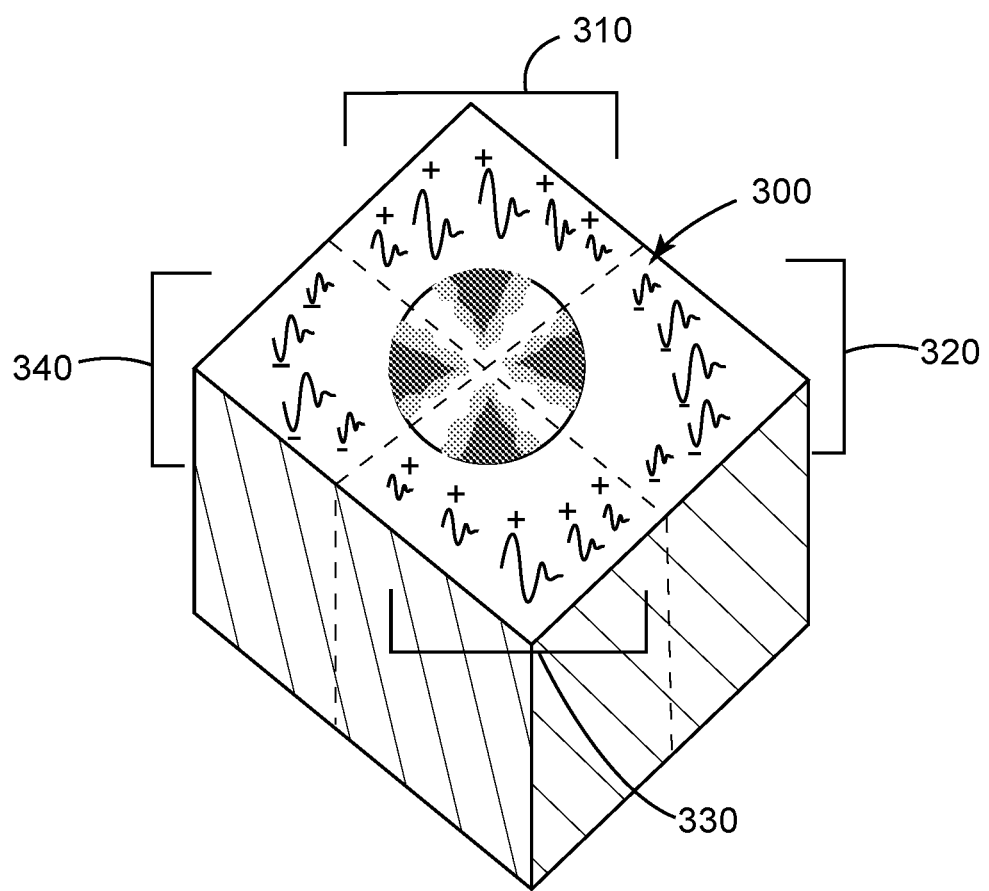
FIG. 5 illustrates an example of the focal mechanism of a microseismic event, in accordance with some embodiments of the present disclosure.

FIG. 5 illustrates a visual depiction of the moment tensor for the microseismic event 110 of FIG. 3 overlaid on the traces from FIG. 4. The visual depiction of the moment tensor as shown in FIG. 5 is a diagram of the compressive and dilatational forces, which necessarily includes the nodal planes at the transition between the compressive and dilatational forces. As shown in FIG. 5, diagram 300 also includes four quadrants, quadrants 310, 320, 330, and 340 that correspond to the traces detected in quadrants 210, 220, 230, and 240 of FIG. 4. Quadrants 310 and 330 include compressive forces and the darker shading indicates an increased magnitude. As the nodal planes are approached, the magnitude of the compressive force approaches zero. Quadrants 320 and 340 include tensile forces, with the darker shading again indicating an increased magnitude with the magnitude decreasing as the nodal planes are approached.

In the present disclosure, by varying the parameters that would define a potential microseismic event and correcting a particular receiver's trace based on the receiver's location and potential magnitude and first motions based on the potential microseismic event, the stacked value of a plurality of traces so corrected provides an enhanced ability to determine whether the potential microseismic event was an actual microseismic event. For example, if a particular set of parameters modifies the signed amplitude of signals such that a high stacking value is reached, this may signify that the set of parameters defines a microseismic event which actually occurred, because the raw data, when corrected based on the potential microseismic event, was of sufficient strength to indicate the occurrence of a microseismic event.

Figure 6:
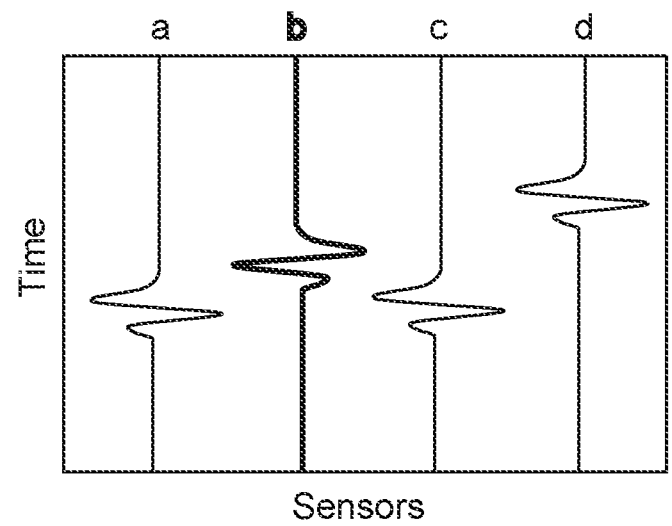
FIG. 6 illustrates example traces recorded from four receivers, a, b, c, and d, in accordance with some embodiments of the present disclosure.
Figure 7:
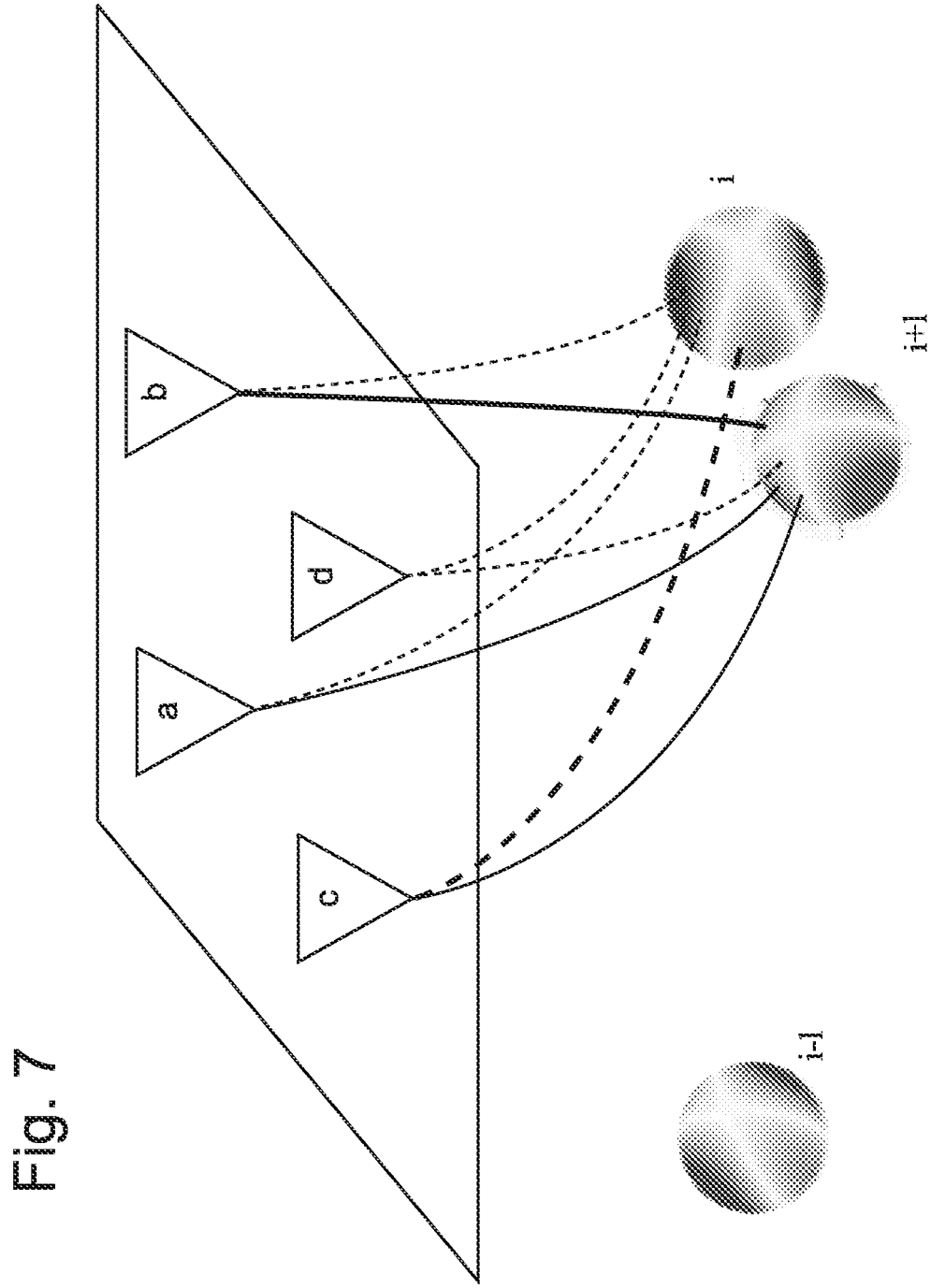
FIG. 7 illustrates example receiver placement and potential microseismic events, in accordance with some embodiments of the present disclosure.

More specifically, FIG. 6 illustrates example traces recorded from four receivers, a, b, c, and d. These receives are placed various distances from the potential microseismic events i, i+1, and i−1 (as illustrated by their respective moment tensors) in FIG. 7. Potential microseismic events i, i+1 and i−1 may be chosen at random. Traces from potential microseismic event i at the four receivers are represented by dashed lines, while traces from potential microseismic event i+1 at the four receivers are represented by solid lines. In addition, traces from the dilatational force quadrants of the moment tensor for both potential microseismic events are indicated by normal lines, while traces from the compressive force quadrants of the moment tensor are indicated by bold lines.

Figures 8A, 8B:
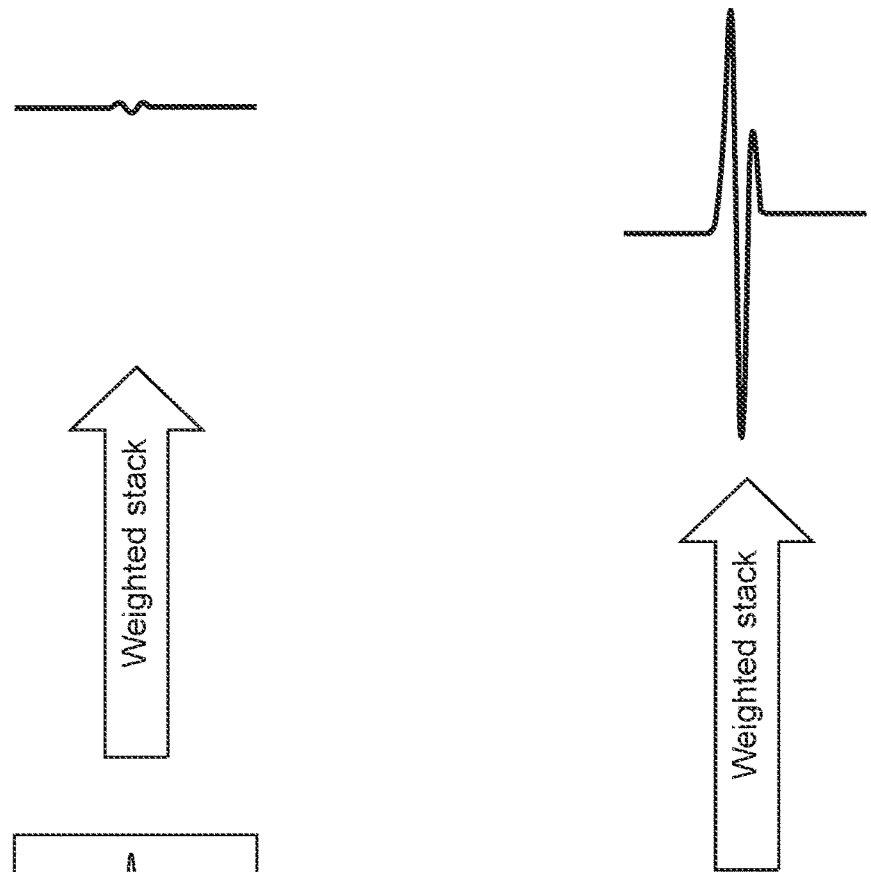
FIG. 8A illustrates example traces and a plot of the stacked value calculated with time shifted and amplitude weighted based on the analyzed position and mechanism for potential microseismic event i from FIG. 7, in accordance with some embodiments of the present disclosure.
FIG. 8B illustrates example traces and a plot of the stacked value calculated with time shifted and amplitude weighted based on the analyzed position and mechanism for potential microseismic event i+1 from FIG. 7, in accordance with some embodiments of the present disclosure.

FIG. 8A illustrates example traces and a plot of the stacked value calculated with time shifted and amplitude weighted based on the analyzed position and mechanism according to an embodiment of the present disclosure for potential microseismic event i. Based on the low stack value, potential microseismic event i would likely not be used for or included in the next iteration in any of the example processes in FIGS. 9, 10, 11 and 12 or in other iterative algorithms of the present disclosure.

FIG. 8B illustrates example traces and a plot of the stacked value calculated with time shifted and amplitude weighted based on the analyzed position and mechanism according to an embodiment of the present disclosure for potential microseismic event i+1. Based on the high stack value, potential microseismic event i+1 would like be used for or included in the next iteration of any of the example process in FIGS. 9, 10, 11 and 12 or in other tentative algorithms of the present disclosure.

Figure 9:
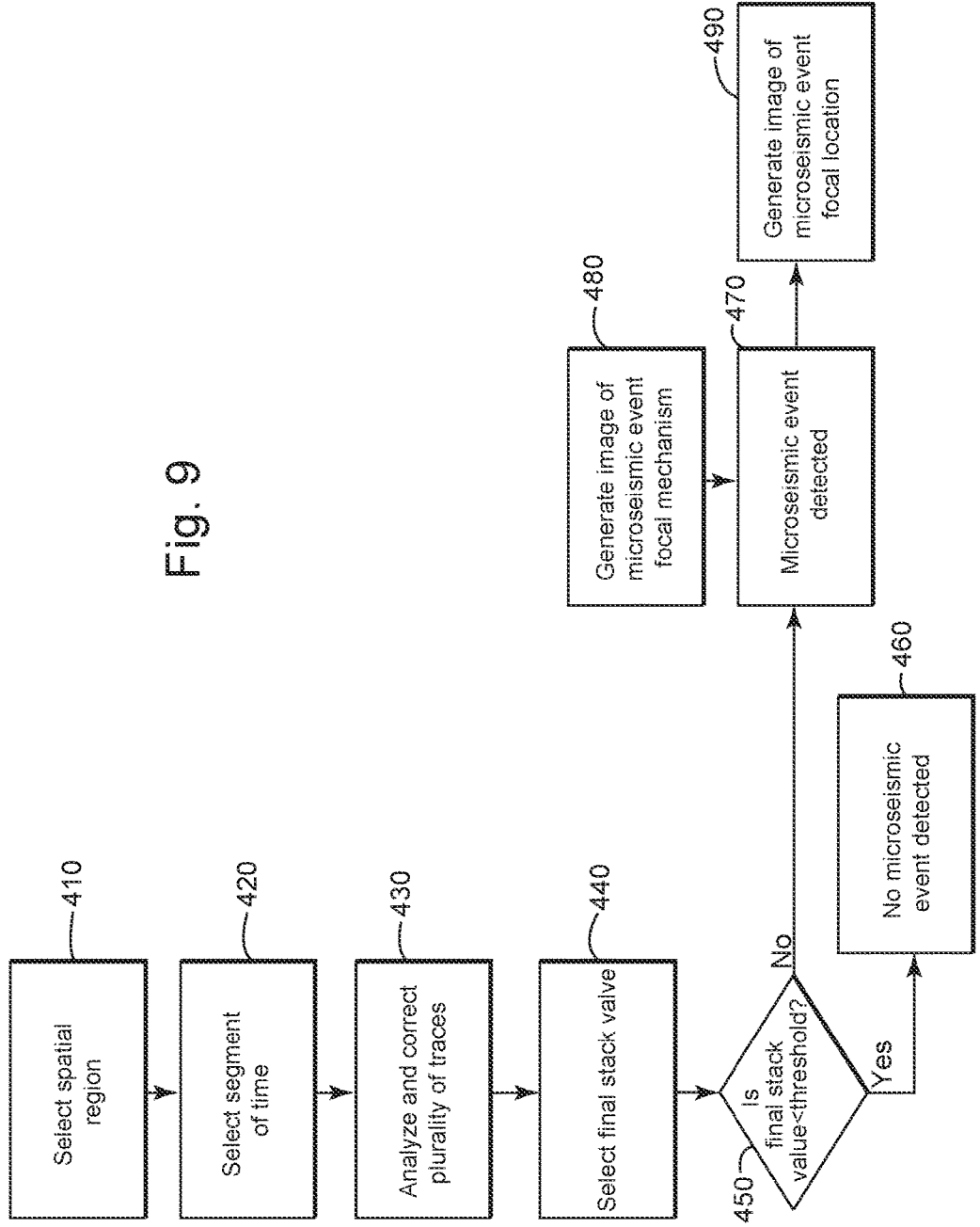
FIG. 9 illustrates an example of a flowchart illustrating a process to detect a microseismic event, in accordance with some embodiments of the present disclosure.

FIG. 9 illustrates an example flowchart of a process indicating steps to detect a microseismic event using an iterative non-linear inversion algorithm. At step 410, a spatial region including at least one position parameter is selected for analysis. A plurality of receivers are located in this spatial region to record traces. A set of parameters are selected for analysis, and may include at least one position parameter, such as X, Y, or Z as well as at least one focal mechanism parameter. In one embodiment, the focal mechanism is described by its tensile mechanism, for example using the S, D, R, and T parameters. In another embodiment, the focal mechanism is described by at least two vector parameters defining the nodal planes. In still another embodiment, the focal mechanism is described by its nine components, including the six different components dictated by the focal mechanism symmetric matrix. In another embodiment, the focal mechanism may be described by a simple double couple using S, D and R parameters. One advantage of the processes and systems described herein is that they may employ a wide variety of parameters.

At step 420, a segment of time is selected for analysis. At step 430, a plurality of traces from the plurality of receivers from the selected segment of time are analyzed and corrected using an iterative non-linear inversion algorithm based on a particular set of parameters for each iteration, the set of parameters defining a potential microseismic event location and focal mechanism. In a given iteration, the traces may be corrected based on signed amplitude, time, or both. For example, if a particular receiver location were to have a negative first motion and be half-way between the maximum amplitude and the zero amplitude nodal plane based on the potential microseismic event location and focal mechanism, the value of the trace for that receiver may be corrected by a factor of negative one half. As another example, if the particular receiver location were to have a positive first motion and be at the maximum amplitude location based on the potential microseismic event location and focal mechanism, the value of the trace for that receiver may be corrected by a factor of positive one and time shifted as is known in the art. Of course, any correcting values can be used and these values between zero and one and positive and negative are merely exemplary.

Once a given set of traces has been corrected, it may be stacked to generate a stack value. This may represent the amplitude of the stacked value of all of the traces, and will be higher the closer the parameters comes to describing an actual microseismic event. A first stacked value associated with a first set of parameters may be retained for comparison to a second stack value associated with a second set of parameters so that the set of parameters with the higher stack value may be determined as being closer to defining an actual microseismic event.

At each iteration of the iterative non-linear inversion algorithm, sets of parameters defining a potential microseismic event, which include position and focal mechanism parameters, are randomly altered, translated into amplitudes, and used to correct traces, which are then stacked. A plurality of the sets of parameters giving the highest stacked trace values is selected and used as the set of parameters for the next iteration of the iterative non-linear inversion algorithm. In this way, a maximum stacking value may be reached over several iterations, yielding the most likely candidate for a microseismic event.

In one embodiment, the iterative non-linear inversion algorithm may be a genetic algorithm. In a more specific embodiment, these sets of parameters may be randomly altered to produce sets of perturbed parameters. In some embodiments, these perturbed parameters may experience only slight or minor variations in their values, rather than a complete randomization of the values of the parameters. In another more specific embodiment, these sets of parameters may be crossed-over so that parameters are mixed among the sets (e.g. the S parameter from a first set of parameters may be switched with the S parameter from a second set of parameters among the plurality of sets) to produce sets of mixed parameters. In still another more specific embodiment, such as that described in FIG. 10, sets of perturbed parameters and sets of mixed parameters may both be used in the genetic algorithm.

In another embodiment, the iterative non-linear inversion algorithm may be a simulated annealing algorithm in which a set of starter parameters is randomly generated or may be estimated based on known factors regarding the spatial or temporal region (for example, if fracking is going on at a certain depth or location). The set of parameters may be perturbed to produce a set of perturbed parameters, which may then replace the starter parameters if the perturbed parameters have a higher stack value. The perturbed parameters may also replace the starter parameters based on comparisons with a random number. In some embodiments, such as that shown in FIG. 11, the simulated annealing algorithm may allow replacement of the starter parameters with perturbed parameters if either the perturbed parameters have a higher stack value, or based on comparisons with a random number.

In another embodiment, the iterative non-linear inversion algorithm may employ elements of both the genetic algorithm and a simulated annealing algorithm. An example of one such algorithm, which includes a parallel simulated tempering algorithm, is presented in FIG. 12.

In still other embodiments, a genetic algorithm, a tempering algorithm, a parallel tempering algorithm, a Monte-Carlo algorithm (which is similar to simulated annealing without the ability to pick the worst stack value, but with a risk of falling to a local minimum), a Metropolis algorithm (which is similar to simulated annealing with a constant t value), a simulated annealing algorithm (which is similar to simulated tempering, but only allows t to decrease), a parallel annealing algorithm, or a combination of these algorithms or elements from any of these algorithms is used as the iterative non-linear inversion algorithm. A person of ordinary skill in the art will recognize that these are only examples of non-linear algorithms and any non-linear algorithm will be readily applicable to the disclosure herein. Some examples of descriptions of non-linear algorithms may be found at Metropolis and Ulam (1949) The Monte Carlo Method, Journal of the American Statistical Association, Vol. 44, No. 247. pp. 335-341; A. S. Fraser (1957) Simulation of genetic systems by automatic digital computers. I. Introduction, Biol. Sci., vol. 10, pp. 484-491, 1957; S. Kirkpatrick, C. D. Gelatt, M. P. Vecchi (1983) Optimization by simulated annealing, Science, New Series, Vol. 220, No. 4598. pp. 671-680; Sambridge (2013) A Parallel Tempering algorithm for probabilistic sampling and multimodal optimization, Geophysical Journal International; Houck C. R., Joines J. A., Kay M. G. (1995) A genetic algorithm for function optimization: a Matlab implementation; and Xiaorong Xie (2012) Genetic Algorithm and Simulated Annealing: A Combined Intelligent Optimization Method and Its Application to Subsynchronous Damping Control in Electrical Power Transmission Systems, Computer and Information Science, Numerical Analysis and Scientific Computing, "Simulated Annealing—Advances, Applications and Hybridizations", Chapter 12; which are incorporated herein by reference in their entirety. Use of linear algorithms or components thereof is limited in most embodiments because results obtained using linear inversion may fall to a local minimum, yielding sub-optimal results.

In some embodiments, the amplitudes of the traces may also be scaled by magnitude. In these embodiments, the location of the microseismic event and the focal mechanism controls the range of amplitudes. However, the amplitudes may be normalized to a value within a selected range of values, for example from negative one to positive one.

At step 440, after a final iteration, the highest stack value is selected as the final stack value. The parameters corresponding to this stack value characterize the potential microseismic event. At step 450, the final stack value is then compared to a predetermined threshold. The predetermined threshold is selected as the cutoff for what is considered a microseismic event. In one embodiment, it may be anything stronger than the mean stack value. In another embodiment, it may be a certain percentage above the mean stack value, such as 10%. For embodiments with persistent noise, the threshold may be 50% or even 100% above the mean stack value. If the final stack value is less than the predetermined threshold, the process proceeds to step 460 and no microseismic event is detected. If the final stack value is greater than the predetermined threshold, then the process proceeds to step 470 and a microseismic event is detected. The process may proceed to optional step 480, in which an image of the focal mechanism of the microseismic event is generated. Alternatively or in addition, the process may proceed to optional step 490, in which an image of the microseismic event location is generated.

Figure 10:
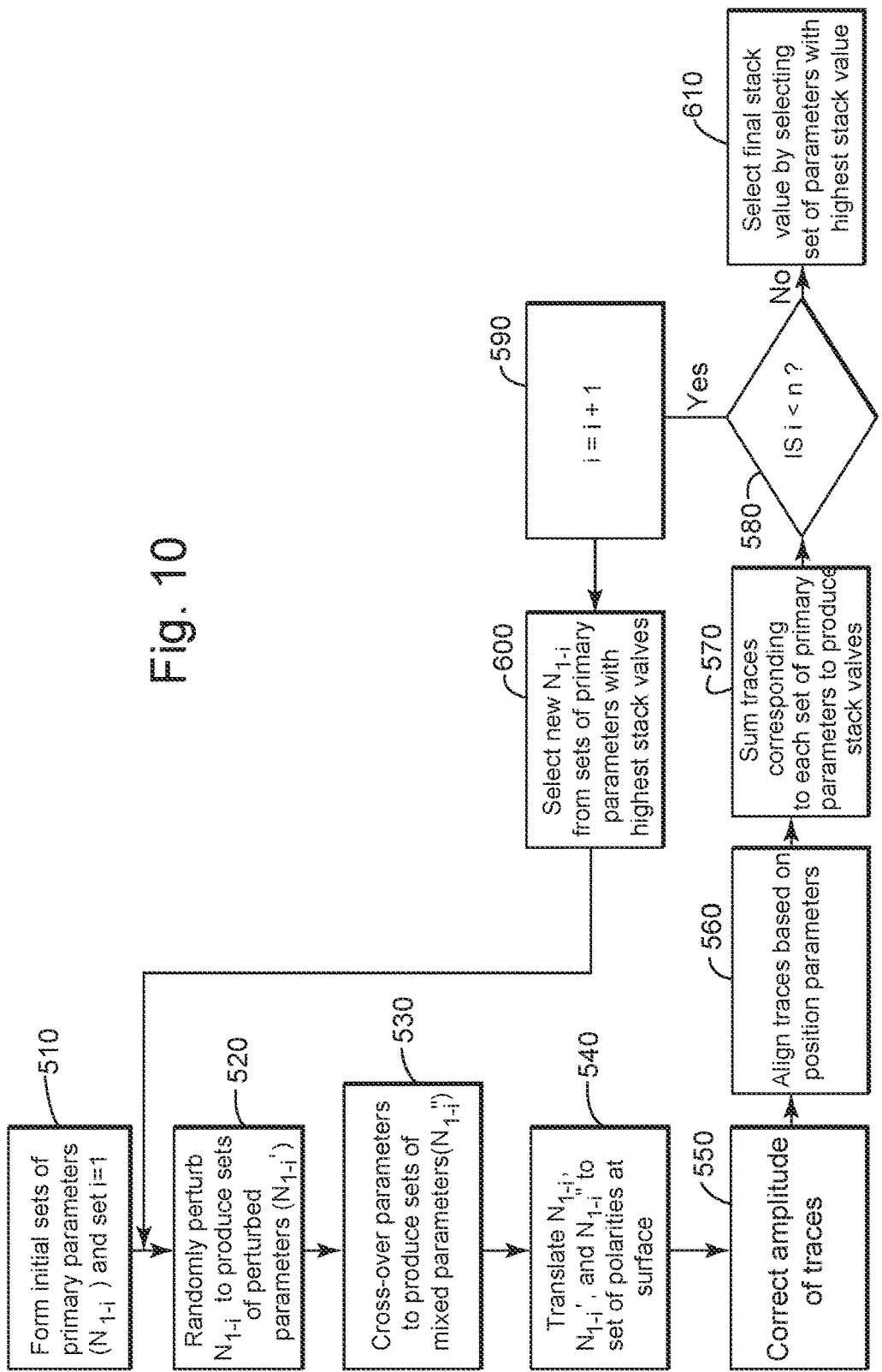
FIG. 10 illustrates an example of a flowchart illustrating an iterative non-linear inversion algorithm used in conjunction with the process of FIG. 5 to detect a microseismic event, in accordance with some embodiments of the present disclosure.

FIG. 10 illustrates an example flowchart of a process indicating steps of a genetic iterative non-linear inversion algorithm used to calculate a final stack value. Such an algorithm is used, in some embodiments, in the process of FIG. 9. At step 510, a plurality of sets of parameters are identified at random as to form initial sets of primary parameters ($N_{1-i}$), representing the initial generation. For the initial sets of parameters i equals one. At step 520, random perturbations of the parameters are performed on a first copy of the sets of primary parameters to produce sets of perturbed parameters ($N_{1-i}'$). Perturbations of each respective parameter, in some embodiments, are small compared to the value of each respective parameter in order to obtain more accurate results. At step 530, parameters from different sets of parameters of the primary parameters are mixed (or "crossed-over") to produce sets of mixed parameters ($N_{1-i}''$). At step 540, the parameters for each corresponding set of primary parameters ($N_{1-i}$), perturbed parameters ($N_{1-i}'$) and mixed parameters ($N_{1-i}''$) are translated into amplitudes at the surface, or in other words, are used to determine what a particular magnitude and amplitude would be at a given receiver location based on the focal mechanism and location of a microseismic event defined by the given set of parameters. At step 550, an amplitude correction is applied to the corresponding traces based on the translation done in step 540. At step 560, the traces are aligned by moving them based on the position parameters. At step 570, the corrected traces are summed to produce stack values corresponding to each set of primary parameters, perturbed parameters, and mixed parameters.

At step 580, i is compared to a selected number n, which corresponds to the pre-selected number of iterations. If i is less than n, then the process proceeds to step 590, in which one is added to i to arrive at a new value of i. The process also proceeds to step 600, in which the next sets of primary parameters ($N_{1-i}$) are selected by selecting a plurality of sets of parameters with the highest stack values. The process then returns to step 520. If, at step 580, i is not less than n, then the process proceeds to step 610, in which the final stack value is selected by selecting the set of parameters with the highest stack value. In an example embodiment, n is at least fifty, or in other words, fifty generations of primary, perturbed, and mixed parameters may be analyzed.

Figure 11:
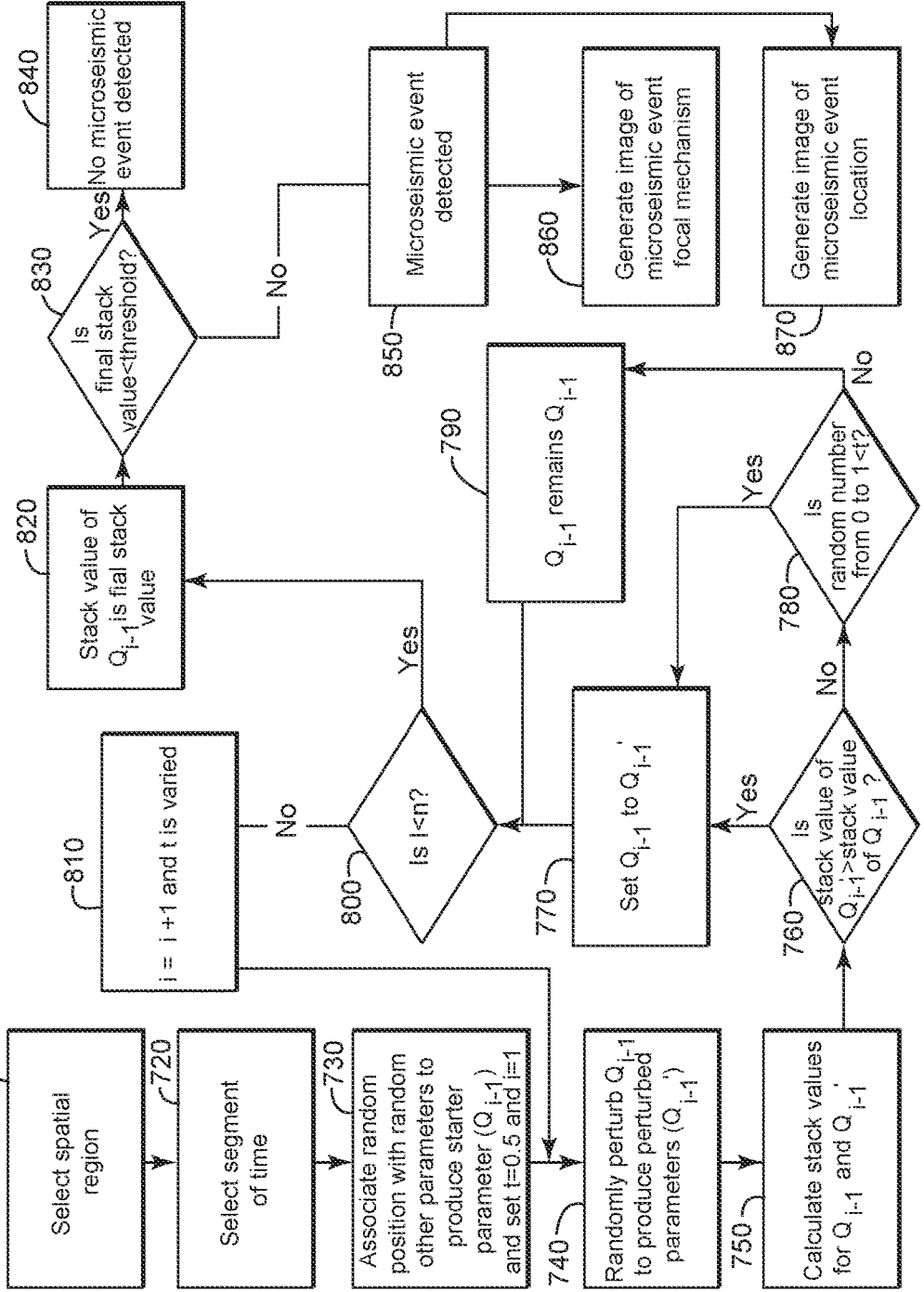
FIG. 11 illustrates an example of a flowchart illustrating a process to detect a microseismic event, in accordance with some embodiments of the present disclosure.

FIG. 11 illustrates an example flowchart of another process indicating steps to detect a microseismic event using a simulated tempering iterative non-linear inversion algorithm. At step 710, a spatial region including at least one position parameter is selected for analysis. A plurality of receivers are also located in this spatial region to record traces. At step 720, a segment of time is selected for analysis. A plurality of traces from the plurality of receivers from the selected segment of time are analyzed and corrected using the iterative non-linear inversion algorithm. At step 730, a random position (defined by at least an X, Y, or Z parameter) in the spatial region is associated with random other parameters. For example, it may be associated with random focal mechanism parameters. The set of parameters thus created is the initial set of starter parameters. The random value (t) between zero and one is selected for the process and i equals one. At step 740, a copy of the set of starter parameters ($Q_{i-1}$) is randomly perturbed to produce a set of perturbed parameters ($Q_{i-1}'$). Perturbations of each respective parameter, in some embodiments, are small compared to the value of each respective parameter in order to obtain more accurate results. At step 750, a stack value is calculated for the set of starter parameters ($Q_{i-1}$) and a stack value is calculated for the set of perturbed parameters ($Q_{i-1}'$). In one embodiment, the stack value may be calculated in a manner similar to that shown in FIG. 10, by translating the parameters into amplitudes at the surface, applying an amplitude correction to the corresponding traces, aligning the traces by moving them based on the position parameters, and summing the corrected traces to produce stack values.

At step 760, if the stack value of the set of perturbed parameters ($Q_{i-1}'$) is higher than the stack value of the set of starter parameters ($Q_{i-1}$), then, at step 770 the set of perturbed parameters ($Q_{i-1}'$) becomes the new set of starter parameters ($Q_{i-1}$). If, at step 760, the stack value for the set of perturbed parameters ($Q_{i-1}'$) is not higher than the stack value for the set of starter parameters ($Q_{i-1}$), then at step 780, a random number between zero and one is generated and compared to t. If the random number is less than t, then the set of perturbed parameters ($Q_{i-1}'$) becomes the new set of starter parameters ($Q_{i-1}$). If the random number is not less than t, then the set of starter parameters ($Q_{i-1}$), remains unchanged at step 790. After either step 770 or step 790, at step 800, i is compared to a selected number n, which corresponds to the pre-selected number of iterations. If i has not yet reached n, then at step 810, i is increased by one and the value of t is randomly varied. The process then returns to step 740. If i is equal to n, then at step 820, the stack value for the current set of starter parameters is selected as a final stack value. The parameters corresponding to this stack value characterize the potential microseismic event. The final stack value is then compared to a predetermined threshold at step 830. If the final stack value is less than the predetermined threshold, the process proceeds to step 840 and no microseismic event is detected. If the final stack value is greater than the predetermined threshold, then the process proceeds to step 850 and a microseismic event is detected. The process may proceed to optional step 860, in which an image of the focal mechanism of the microseismic event is generated. Alternatively or in addition, the process may proceed to optional step 870, in which an image of the microseismic event location is generated.

In one embodiment, n is at least five thousand. In another embodiment, t is initially set to 0.5 to avoid a local maximum. In another embodiment, t is on the order of the perturbations of the parameters. In some embodiments, rather than using a pre-selected number of iterations n, a stopping threshold may be selected such that the stack value is compared to the stopping threshold. If the stack value exceeds the stopping threshold, then the stack value becomes the final stack value. In such an embodiment, the iterations may continue until the stopping threshold is reached, a pre-determined number of iterations is reached, or there is user interaction to stop the process. For example, utilizing the stopping threshold may be a way to stop before all n iterations have been performed. In an alternative to the embodiment of FIG. 11, in step 810, t is set to t*0.99.

To the extent elements of FIG. 11 overlap with elements of FIG. 9, such as the types of parameters that may be used, the process of FIG. 11 may include all variations described specifically for FIG. 9.

Figure 12:
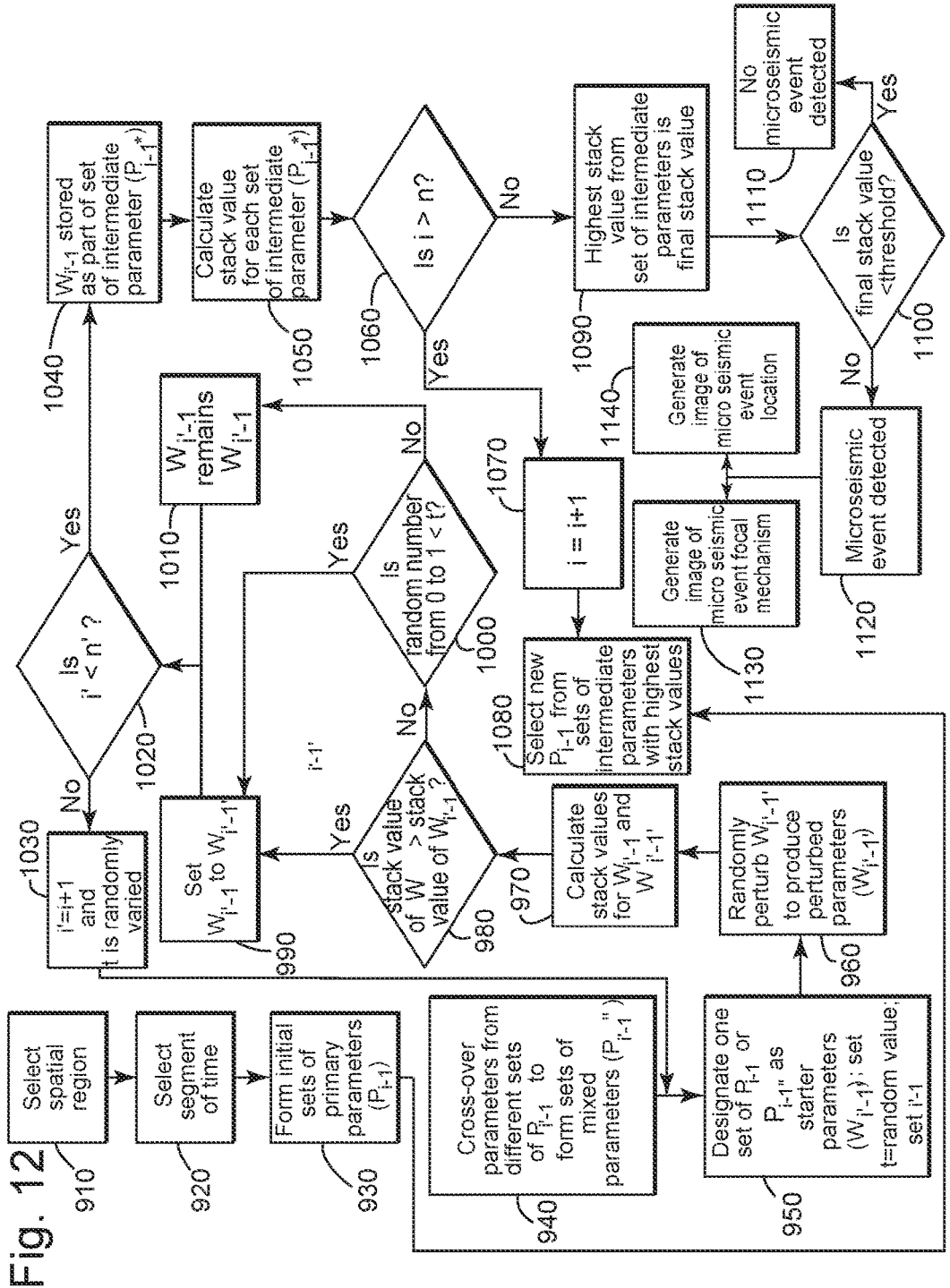
FIG. 12 illustrates an example of a flowchart illustrating a process to detect a microseismic event, in accordance with some embodiments of the present disclosure.

FIG. 12 illustrates an example flowchart of another process indicating steps to detect a microseismic event using an iterative non-linear inversion algorithm combining elements from a genetic algorithm and a simulated tempering algorithm. The algorithm of FIG. 12 provides enhanced optimization as compared to a genetic algorithm alone and looks at a broader range of events than a simulated tempering algorithm alone. At step 910, a spatial region including at least one position parameter is selected for analysis. A plurality of receivers are also located in this spatial region to record traces. At step 920, a segment of time is selected for analysis. A plurality of traces from the plurality of receivers from the selected segment of time are analyzed and corrected using the iterative non-linear inversion algorithm. At step 930, a plurality of sets of parameters are identified at random to form initial sets of primary parameters ($P_{i-1}$). For the initial sets of parameters i equals one.

At step 940 parameters from copies of different sets of primary parameters are mixed (or "crossed-over") to produce sets of mixed parameters ($P_{i-1}''$). At step 950, one set of primary parameters or mixed parameters is designated as starter parameters ($W_{i'-1}$) and enter the annealing process. Temperature t is set to a random value and i' is set to 1. At step 960, a copy of the starter parameters is randomly perturbed to produce a set of perturbed parameters ($W_{i'-1}'$). Perturbations of each respective parameter, in some embodiments, are small compared to the value of each respective parameter in order to obtain more accurate results.

At step 970, a stack value is calculated for the set of starter parameters ($W_{i'-1}$) and a stack value is calculated for the set of perturbed parameters ($W_{i'-1}'$). At step 980, if the stack value of the set of perturbed parameters ($W_{i'-1}'$) is higher than the stack value of the set of starter parameters ($W_{i'-1}$), then, at step 990 the set of perturbed parameters ($W_{i'-1}'$) becomes the new set of starter parameters ($W_{i'-1}'$). If, at step 980, the stack value for the set of perturbed parameters ($W_{i'-1}'$) is not higher than the stack value for the set of starter parameters ($W_{i'-1}$), then at step 1000, a random number between zero and one is generated and compared to t. If the random number is less than t, then the set of perturbed parameters ($W_{i'-1}'$) becomes the new set of starter parameters ($W_{i'-1}$). If the random number is not less than t, then the set of starter parameters ($W_{i'-1}$) remains unchanged at step 1010.

After either step 990 or step 1010, at step 1020, i' is compared to a pre-selected number n', which corresponds to the pre-selected number of iterations of the annealing process. If i' has not yet reached n', then at step 1030, i' is increased by one and the value of t is randomly varied. The process then returns to step 950. If i' is equal to n' at step 1020, then in step 1040, the current set of starter parameters is stored as part of a set of intermediate parameters ($P_{i-1}*$) and steps 950 through 1020 are repeated until they have been performed for each set of parameters in the primary sets of parameters ($P_{i-1}$) and mixed sets of parameters ($P_{i-1}''$). In one embodiment, at least eighteen sets of intermediate parameters are generated.

Then, at step 1050, a stack value is calculated for each set of intermediate parameters ($P_{i-1}*$). In one embodiment, the stack value may be calculated in a manner similar to that shown in FIG. 10, by translating the parameters into amplitudes at the surface, applying an amplitude correction to the corresponding traces, aligning the traces by moving them based on the position parameters, and summing the corrected traces to produce stack values. At step 1060, i is compared to a selected number n, which corresponds to the pre-selected number of iterations of the overall algorithm. If i does not yet equal n, then the process proceeds to step 1070, in which one is added to i to arrive at a new value of i. The process also proceeds to step 1080, in which the next sets of primary parameters ($P_{1-i}$) are selected by selecting sets of parameters with the maximum stack values from the sets of intermediate parameters ($P_{1-i}^*$). The process then returns to step 940. If, at step 1060, i equals n, then the process proceeds to step 1090, in which the final stack value is selected by selecting the set of parameters from the intermediate sets of parameters ($P_{1-i}^*$) with the highest stack value. The parameters corresponding to this stack value characterize the potential microseismic event.

The final stack value is then compared to a predetermined threshold at step 1100. If the final stack value is less than the predetermined threshold, the process proceeds to step 1110 and no microseismic event is detected. If the final stack value is greater than the predetermined threshold, then the process proceeds to step 1120 and a microseismic event is detected. The process may proceed to optional step 1130, in which an image of the focal mechanism of the microseismic event is generated. Alternatively or in addition, the process may proceed to optional step 1140, in which an image of the microseismic event location is generated.

To the extent elements of FIG. 12 overlap with elements of FIGS. 9, 10 and 11, such as the types of parameters that may be used, the process of FIG. 12 may include all variations described specifically for FIGS. 9, 10 and 11.

Figure 13:
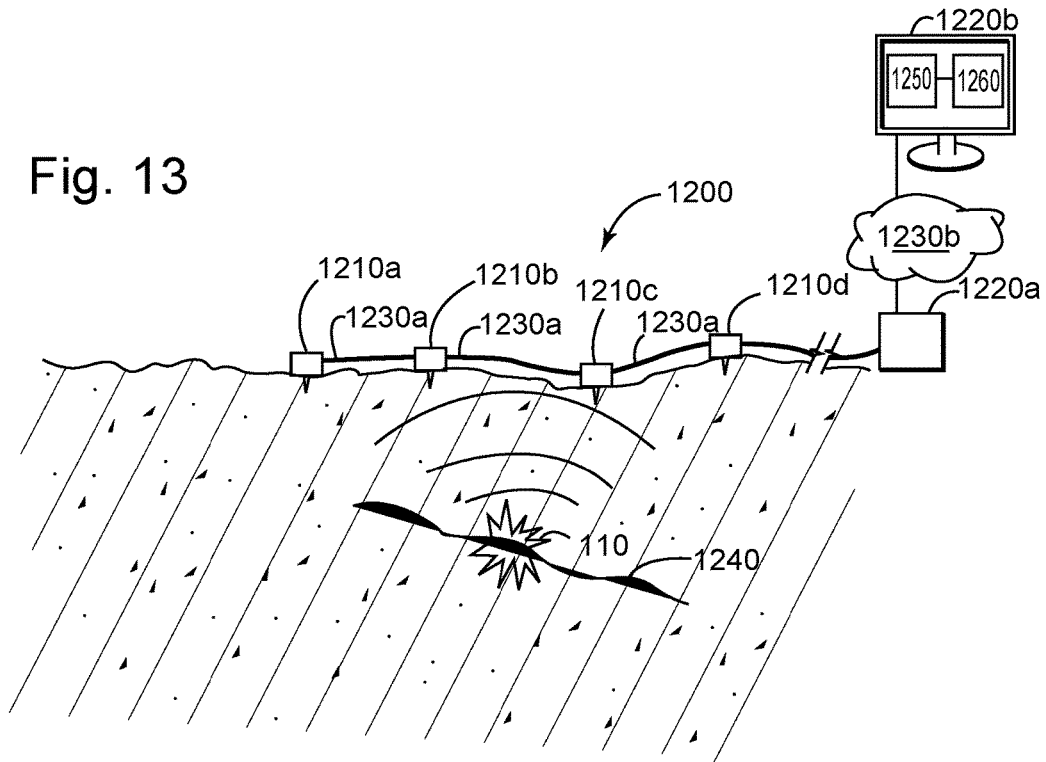
FIG. 13 illustrates an example of a microseismic monitoring system, in accordance with some embodiments of the present disclosure.

FIG. 13 illustrates an example of a microseismic monitoring system 1200 that may be utilized to generate raw data, including, but not limited to, traces and parameters discussed herein, associated with microseismic events, and to perform the data processing necessary to detect a microseismic event, in accordance with some embodiments of the present disclosure. System 1200 may be any collection of systems, devices, or components configured to detect, record, or process data associated with a microseismic event. For example, system 1200 may include one or more receivers (for example receivers 1210a-1210d, which may be receivers a-d in FIGS. 6, 7 and 8) communicatively coupled to one or more computing devices 1220 via one or more networks 1230a and 1230b. A plurality of receivers 1210a-1210d may be connected by a first network 1230a. First network 1230a may connect receivers 1210a-1210d with a first computing device 1220a. First computing device 1220a may be connected to a second computing device 1220b via a second network 1230b. System 1200 may monitor for a microseismic event, for example, microseismic event 110 along fault 1240, and may measure or sense data associated with microseismic event 110. System 1200 may additionally process data associated with microseismic event 110, including data related to traces or parameters. For example, system 1200 may use the raw data associated with microseismic event 110 to detect microseismic event 110.

System 1200 monitors for microseismic events within subsurface formations. As used herein, a subsurface formation may refer to a single rock layer or a collection of rock layers. A subsurface formation may also refer to a particular arrangement of rock layers, which may include some particular feature within the rock layers. For example, a subsurface formation may include a trap or other feature where hydrocarbons have collected in a pool or reservoir. A subsurface formation may also include one or more rock layers containing a producing well, an observation well, a hydraulic fracturing well, or any other feature to access or observe a subsurface formation.

System 1200 uses one or more receivers to detect or measure information regarding a microseismic event. Receivers 1210a-1210d may be located on or proximate to the surface of the earth within an area being monitored for microseismic events. Receivers 1210a-1210d may be any type of instrument that is utilized to transform seismic energy or vibrations into a readable signal. For example, receivers 1210a-1210d may be geophones configured to detect or record energy waves from microseismic event 110 and convert the mechanical motion experienced at the receiver into an electrical signal. Receivers 1210a-1210d may also be accelerometers that sense the change in acceleration at receivers 1210a-1210d due to microseismic event 110 and convert that change in acceleration to an electrical signal. Receivers 1210a-1210d may also be optical devices or optical geophones, for example, distributed acoustic sensing (DAS) devices. In such an embodiment, receivers 1210a-1210d output a digital signal representative of the optical phase in an interferometer, which varies in response to mechanical motion. Receivers 1210a-1210d may comprise vertical, horizontal, or multicomponent receivers. For example, receivers 1210a-1210d may be multicomponent receivers like three component (3C) geophones, 3C accelerometers, or 3C Digital Sensor Units (DSU).

Receivers 1210a-1210d may be configured to detect P-waves or S-waves. A P-wave may be referred to as a primary wave, pressure wave, longitudinal wave, or compressional wave. A P-wave may be referred to as a primary wave because a P-wave may be the first wave to arrive at a particular receiver 1210 after a microseismic event has occurred. P-waves propagate with particle motion perpendicular to the wavefront from microseismic event 110. An S-wave may be referred to as a shear wave or secondary wave. S-waves may be polarized in the horizontal plane (classified as SH waves) and in the vertical plane (classified as SV waves).

Multiple receivers 1210a-1210d may be utilized within an area to provide data related to multiple locations and distances from microseismic event 110. Receivers 1210a-1210d may be positioned in multiple configurations, such as linear, grid, array, or any other suitable configuration. In some embodiments, receivers 1210a-1210d may be positioned along one or more strings, which may be part of network 1230a. Each receiver may be spaced apart from adjacent receivers in the same string. Spacing between receivers in a string may be approximately the same preselected distance, or span, or spacing may vary depending on a particular application, area topology, or other suitable parameter.

System 1200 uses receivers 1210a-1210d to record or measure microseismic event 110 along fault 1240. Fault 1240 may include any fracture or discontinuity in a subsurface formation along which there may be movement. For example, due to friction and rigidity of rock, stresses may build in rock until they exceed a strain threshold, and motion along fault 1240 may occur. The motion may be large and noticeable, for example, large earthquakes. However, the motion may also be small and imperceptible to the average human. These smaller motions may be referred to as microseismic events of which event 1240 is an example, and may be as low as negative six on the Richter scale. However, microseismic event 110 may also be significantly larger, for example, around two or three on the Richter scale or even larger. In some circumstances, multiple microseismic events occur along fault 1240. These may occur simultaneously, in quick succession, or over a delayed period of time.

Computing devices 1220a and 1220b may include any instrumentality or aggregation of instrumentalities operable to compute, classify, process, transmit, receive, store, display, record, or utilize any form of information, intelligence, or data. For example, computing devices 1220a and 1220b may comprise a personal computer, a storage device, or any other suitable device and may vary in size, shape, performance, functionality, and price.

Computing devices 1220*a* and 1220*b* may include a processing unit 1250 and a memory unit 1260. For example, computing devices 1220*a* and 1220*b* may include random access memory (RAM), one or more processing resources such as a central processing unit (CPU) or hardware or software control logic, other types of volatile or non-volatile memory, or any combination of the foregoing. Additional components of computing devices 1220*a* and 1220*b* may include one or more disk drives, one or more network ports for communicating with external devices, various input and output (I/O) devices, such as a keyboard, a mouse, and a video display. Computing devices 1220*a* and 1220*b* may be located in a station truck, a drilling platform, or any other suitable enclosure. Computing devices 1220*a* and 1220*b* may be configured to permit communication over any type of network, such as a wireless network, a local area network (LAN), a wide area network (WAN) (for example, the Internet), or any combination thereof.

Processing unit 1250 may comprise any system, device, or apparatus operable to interpret program instructions, execute program instructions, process data, or any combination thereof. For example, processing unit 1250 may execute instructions to determine a moment tensor with its associated nodal planes from raw data of microseismic event 110. Processing unit 1250 may include, without limitation, a microprocessor, microcontroller, digital signal processor (DSP), application specific integrated circuit (ASIC), or any other digital or analog circuitry configured to interpret program instructions, execute program instructions, process data, or any combination thereof. In some embodiments, processing unit 1250 may interpret program instructions, execute program instructions, or process data stored in memory unit 1260, storage resources, another component of computing device, or any combination thereof.

Memory unit 1260 may be communicatively coupled to processing unit 1250 and may comprise any system, device, or apparatus operable to retain program instructions or data for a period of time (for example, computer-readable media). Memory unit 1260 may comprise random access memory (RAM), electrically erasable programmable read-only memory (EEPROM), a PCMCIA card, flash memory, magnetic storage, opto-magnetic storage, or any suitable selection or array of volatile or non-volatile memory that retains data after power to computing device 1220*b* is turned off.

In some embodiments, computing devices 1220*a* and 1220*b* may be located in close proximity to each other, or may be remotely located from each other. Computing devices 1220*a* and 1220*b* may also vary greatly in their type, components, or make-up, but need not do so. For example, computing device 1220*a* may be a simple computing device primarily configured to collect raw data from receivers 1210*a*-1210*d* and provide the data to computing device 1220*b*. Alternatively, computing device 1220*b* may be a super-computer configured to perform exhaustive, complex, multi-variable and multi-dimensional computation and processing.

Network 1230*a* may provide wire-line transmission between receivers 1210*a*-1210*d* and computing device 1220*a*. Computing device 1220*a* may then be in communication with computing device 1220*b* via network 1230*b*, which may be via wire-line or wireless transmission. It may also be described that receivers 1210*a*-1210*d* are communicatively coupled with computing device 1220*b*. For example, they may be coupled through networks 1230*a* and 1230*b* and computing device 1220*a*. Computing devices 1220*a* and 1220*b* can be described as a single computing device.

For the purposes of this disclosure, the term "wire-line transmissions" may be used to refer to all types of electromagnetic or optical communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic or optical signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, or any other suitable medium.

For the purposes of this disclosure, the term "wireless transmissions" may be used to refer to all types of electromagnetic communications that do not require a wire, cable, or other types of conduits. Examples of wireless transmissions which may be used include, but are not limited to, personal area networks (PAN) (for example, BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infra-red, and laser. Examples of wireless transmissions for use in wide area networks (WAN) include, but are not limited to, narrowband personal communications services (nPCS), personal communication services (PCS such as CDMA, TMDA, GSM, UMTS, LTE, etc.) circuit switched cellular, and cellular digital packet data (CDPD), etc.

Networks 1230*a* and 1230*b* may be any instrumentality or aggregation of instrumentalities operable to provide data communication between one or more devices, in one or both directions. Networks 1230*a* and 1230*b* may be implemented as, or may be a part of, a personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data, or messages (generally referred to as data), or any combination thereof. Networks 1230*a* and 1230*b* may transmit data using wireless transmissions, wire-line transmissions, or a combination thereof via any storage protocol, communication protocol, or combination thereof, including without limitation, Fibre Channel, Frame Relay, Asynchronous Transfer Mode (ATM), Internet protocol (IP), Transmission Control Protocol (TCP), Internet Printing Protocol (IPP), other packet-based protocol, or any combination thereof. Networks 1230*a* and 1230*b* and their various components may be implemented using hardware, software, or any combination thereof.

Figure 14:
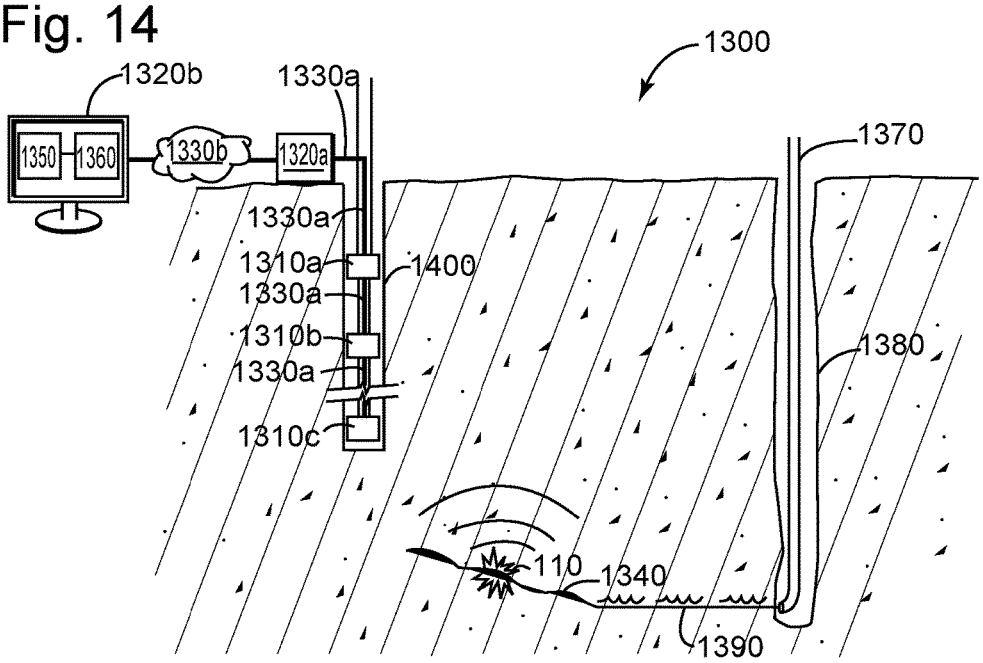
FIG. 14 illustrates an alternative example of a microseismic monitoring system, in accordance with some embodiments of the present disclosure.

FIG. 14 illustrates an alternative example of a microseismic monitoring system 1300 for detecting a microseismic event, in accordance with some embodiments of the present disclosure. Similar components having a similar description to those shown in FIG. 13 are present in FIG. 14, and so the written description of those components is not duplicated with an understanding that the same description of these components with respect to FIG. 13 are equally applicable to the components shown in FIG. 14. For example, receivers 1210a-1210d of FIG. 13 are comparable to receivers 1310a-1310c of FIG. 14 (which may also correspond to receivers a-d in FIGS. 6, 7 and 8). Networks 1230a and 1230b are comparable to networks 1330a and 1330b. Computing devices 1220a and 1220b are comparable to computing device 1320a and 1320b.

Microseismic monitoring system 1300 shown in FIG. 14 may be one example of a system utilized to monitor, record, or process data associated with microseismic events caused by hydraulic fracturing. As shown in FIG. 14, an injection system 1370 may be disposed within a well 1380 to facilitate hydraulic fracturing. For example, a high-pressure fluid 1390 may be injected into well 1380 causing micro-fractures in the subsurface formations. These micro-fractures may occur at or along fault 1340 and may result in a microseismic event such as microseismic event 110. As described previously, the opening, expansion, and closing of a fracture can all occur along the same fault 1340 and may appear as a series of microseismic events that happen over time.

As shown in FIG. 14, rather than being disposed along the surface of the ground, receivers (for example, receivers 1310a-1310c) may be disposed within an observation well 1400 or other underground location like a mineshaft. Receivers 1310a-1310c may be attached to a drill string 1410, or may be coupled to any other apparatus or device configured to be disposed within an observation well 1400. Receivers 1310a-1310c may also be placed directly upon the rock surface within observation well 1400. Receivers 1310a-1310c may also be permanently cemented into place in observation well 1400.

As shown in FIG. 14 and similarly to the arrangement shown in FIG. 13, receivers 1310a-1310c may be communicatively coupled to computing device 1320a via network 1330a. Computing device 1320a may be communicatively coupled with computing device 1320b via network 1330b. Computing devices 1320a and 1320b and network 1330b may be collapsed into a single computing device.

Determining fault plane 1340 during hydraulic fracturing may provide for a detailed view of the progress and profile of micro-fractures during the hydraulic fracturing process. This may allow oil and gas well operators insight into evaluation of the micro-fractures as well as optimization of the hydraulic fracturing process. For example, the oil or gas well operator may be able to characterize the induced micro-fracture structure and distribution of conductivity within a subsurface formation containing oil or gas, based at least in part on the location of fault planes 1340. Understanding the location and structure of fault planes or microfractures may also facilitate an understanding of the distribution of fracture conductivity, which may facilitate a reservoir model of the oil or gas well that can accurately predict well performance.

The present disclosure may refer to a computer-readable medium as storing instructions, for example, for determining a moment tensor or finding a common nodal plane. For the purposes of this disclosure, computer-readable media may include any instrumentality or aggregation of instrumentalities that may retain data or instructions for a period of time. Computer-readable media may include, without limitation, storage media such as a direct access storage device (for example, a hard disk drive or floppy disk), a sequential access storage device (for example, a tape disk drive), compact disk, CD-ROM, DVD, random access memory (RAM), read-only memory (ROM), electrically erasable programmable read-only memory (EEPROM), flash memory, or any combination of the foregoing.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A method for detecting microseismic events and using the detected microseismic events to monitor an oil and/or gas exploration or exploitation site, the method comprising:
determining a spatial region for analysis;
for each potential microseismic event,
selecting a segment of time for analysis,
analyzing and correcting a plurality of traces acquired by a plurality of receivers placed over the spatial region during the segment of time using an iterative nonlinear inversion algorithm, wherein each iteration of the non-linear algorithm corrects the plurality of traces using at least one set of parameters defining the potential microseismic event, each set of the at least one set of parameters comprising at least one position and at least one focal mechanism parameter,
determining whether a final stack value of the plurality of traces corrected based on the at least one set of parameters of a final iteration of the iterative non-linear inversion algorithm exceeds a predetermined threshold, and
if the final stack value exceeds the predetermined threshold, establishing that an actual microseismic event defined by the at least one set of parameters of final iteration has been detected;
generating an image depicting the at least one position of one or more established actual seismic events;
optimizing hydraulic fracturing based on the image.

2. The method of claim 1, wherein correcting the plurality of traces comprises:
translating and modeling the at least one set of parameters into at least one signed amplitude and a time shift;
correcting the plurality of traces based on the at least one set of parameters; and
stacking the corrected traces.

3. The method of claim 1, wherein the iterative non-linear inversion algorithm is selected from the group consisting of a genetic algorithm, a simulated tempering algorithm, a Monte-Carlo algorithm, a Metropolis algorithm, a simulated annealing algorithm, a parallel tempering algorithm, a parallel annealing algorithm, a combination thereof, and an algorithm having a combination of elements thereof.

4. The method of claim 1, wherein the iterative non-linear inversion algorithm comprises:
setting a variable i as 1;
pre-selecting a number of iterations, n;
identifying at random a plurality of sets of parameters as initial sets of primary parameters;
randomly perturbing the parameters of a first copy of the sets of primary parameters to produce sets of perturbed parameters;
mixing parameters from a second copy of the sets of primary parameters to produce sets of mixed parameters;
translating the parameters for each corresponding set of primary parameters, perturbed parameters, and mixed parameters into signed amplitudes;
applying a correction to corresponding traces;
aligning the corrected traces based on at least one position parameter;
summing the corrected traces to produce stack values corresponding to each set of primary parameters; and
comparing i to n and, if i is less than n, adding 1 to i and repeating the prior steps of the algorithm, or, if i is not less than n, selecting a final stack value by selecting the set of parameters with the highest stack value.

5. The method of claim 1, wherein the iterative non-linear inversion algorithm comprises:
setting a variable i as 1;
pre-selecting a stopping threshold;
setting a variable t as a random number between 0 and 1;
associating at least one random position parameter with at least one focal mechanism parameter to form an initial set of starter parameters;
randomly perturbing a copy of the set of starter parameters to produce a set of perturbed parameters;
calculating a stack value for the set of starter parameters and a stack value for the set of perturbed parameters;
comparing the stack value for the set of perturbed parameters to the stack value for the set of starter parameters and, if the stack value for the perturbed parameters is higher or if a random number is less than t, replacing the set of starter parameters with the set of perturbed parameters selecting the parameters with the highest stack value as the new set of starter parameters; and
comparing the highest stack value with the stopping threshold and if the highest stack value is less than the stopping threshold, adding 1 to i, varying t, and repeating the prior steps of the algorithm, or, if the highest stack value is not less than the stopping threshold, selecting the stack value for the set of starter parameters as a final stack value.

6. The method of claim 5, wherein
a magnitude of the random perturbations are proportional to the value of t, and/or
varying t comprises randomly selecting a value of t between 1 and 0.

7. The method of claim 5, wherein varying t comprises decreasing t.

8. The method of claim 1, wherein the iterative non-linear inversion algorithm comprises:
setting a variable i as 1;
pre-selecting a number of iterations, n;
identifying at random a plurality of sets of parameters as initial sets of primary parameters;
mixing parameters from a copy of the sets of primary parameters to produce sets of mixed parameters;
for each set of primary parameters and each set of mixed parameters,
performing a sub-algorithm comprising:
setting a variable i' as 1;
pre-selecting a number of iterations, n'
setting a variable t as a random number between 0 and 1;
setting the set of primary parameters or mixed parameters as a set of starter parameters;
randomly perturbing a copy of the set of starter parameters to produce a set of perturbed parameters;
calculating a stack value for the set of starter parameters and a stack value for the set of perturbed parameters;
comparing the stack value for the set of perturbed parameters to the stack value for the set of starter parameters and, if the stack value for the perturbed parameters is higher or if a random number is less than t, replacing the set of starter parameters with the set of perturbed parameters selecting the parameters with the highest stack value as the new set of starter parameters; and
comparing i' to n' and if i' is less than n', adding 1 to i', varying t, and repeating the prior steps of the algorithm, or, if i' is not less than n', selecting the set of starter parameters as a set of intermediate parameters;
translating the parameters for each corresponding set of intermediate parameters into signed amplitudes at the surface;
applying an amplitude correction to corresponding traces;
aligning the corrected traces based on at least one position parameter;
summing the corrected traces to produce stack values corresponding to each set of intermediate parameters; and
comparing i to n and, if i is less than n, adding 1 to i and repeating the prior steps of the algorithm, or, if i is not less than n, selecting a final stack value by selecting the set of parameters with the highest stack value.

9. The method of claim 8, wherein
a magnitude of the random perturbations of the copy of the starter parameters are proportional to the value of t, and/or
varying t comprises randomly selecting a value of t between 1 and 0.

10. The method of claim 8, wherein varying t comprises decreasing t.

11. The method of claim 1, the image also depicts a focal mechanism of the one or more established actual seismic event.

12. A microseismic monitoring system for detecting microseismic events and using the detected microseismic events to monitor an oil and/or gas exploration or exploitation site, the system comprising:
a plurality of receivers configured to record traces due to microseismic events;
a network communicatively coupled to the plurality of receivers; and
a computing unit coupled to the plurality of receivers via the network, the computing unit comprising a processor unit and a memory unit coupled to the processing unit, the memory unit including instructions that, when executed by the processing unit, are configured to:
determine a spatial region for analysis;
for each potential microseismic event,
select a segment of time for analysis;
analyze and correct a plurality of traces recorded by the plurality of receivers over the spatial region during the segment of time using an iterative nonlinear inversion algorithm, wherein each iteration of the non-linear algorithm corrects the plurality of traces using at least one set of parameters defining the microseismic event, each set of the at least one set of parameters comprising at least one position and at least one focal mechanism parameter;
determine whether a final stack value of the plurality of traces corrected based on the at least one set of parameters of a final iteration of the iterative non-linear inversion algorithm exceeds a predetermined threshold;
if the final stack value exceeds the predetermined threshold, establishing that an actual microseismic event defined by the at least one set of parameters of final iteration has been detected;
generate an image depicting the at least one position of one or more established actual seismic events; and
optimize hydraulic fracturing based on the image.

13. The system of claim 12, wherein the iterative non-linear inversion algorithm comprises:
setting a variable i as 1;
pre-selecting a number of iterations, n;
identifying at random a plurality of sets of parameters as initial sets of primary parameters;
mixing parameters from a copy of the sets of primary parameters to produce sets of mixed parameters;
for each set of primary parameters and each set of mixed parameters, performing a sub-algorithm comprising:
setting a variable i' as 1;
pre-selecting a number of iterations, n' setting a variable t as a random number between 0 and 1;
setting the set of primary parameters or mixed parameters as a set of starter parameters;
randomly perturbing a copy of the set of starter parameters to produce a set of perturbed parameters;
calculating a stack value for the set of starter parameters and a stack value for the set of perturbed parameters;
comparing the stack value for the set of perturbed parameters to the stack value for the set of starter parameters and, if the stack value for the perturbed parameters is higher or if a random number is less than t, replacing the set of starter parameters with the set of perturbed parameters selecting the parameters with the highest stack value as the new set of starter parameters; and
comparing i' to n' and if i' is less than n', adding 1 to i', varying t, and repeating the prior steps of the algorithm, or, if i' is not less than n', selecting the set of starter parameters as a set of intermediate parameters;
translating the parameters for each corresponding set of intermediate parameters into signed amplitudes at the surface;
applying an amplitude correction to corresponding traces;
aligning the corrected traces based on at least one position parameter;
summing the corrected traces to produce stack values corresponding to each set of intermediate parameters; and
comparing i to n and, if i is less than n, adding 1 to i and repeating the prior steps of the algorithm, or, if i is not less than n, selecting a final stack value by selecting the set of parameters with the highest stack value.

14. The system of claim 12, further comprising an injection system configured to inject liquid into a wellbore to induce hydraulic fracturing.

15. The system of claim 12, further comprising a monitoring well and wherein at least one of the plurality of receivers are located in the monitoring well.

16. A non-transitory computer-readable medium containing instructions that, when executed by a processor, are configured to:
determine a spatial region for analysis;
for each potential microseismic event,
select a segment of time for analysis,
analyze and correct a plurality of traces acquired by a plurality of receivers placed over the spatial region during the segment of time using an iterative non-linear inversion algorithm, wherein each iteration of the non-linear algorithm corrects the plurality of traces using at least one set of parameters defining the microseismic event, each set of the at least one set of parameters comprising at least one position and at least one focal mechanism parameter,
determine whether a final stack value of the plurality of traces corrected based on the at least one set of parameters of a final iteration of the iterative non-linear inversion algorithm exceeds a predetermined threshold, and
if the final stack value exceeds the predetermined threshold, establish that an actual microseismic event defined by the at least one set of parameters of final iteration has been detected;

generate an image depicting the at least one position of one or more established actual seismic events; and optimize hydraulic fracturing based on the image.

17. The computer-readable medium of claim 16, wherein the iterative nonlinear inversion algorithm comprises:

setting a variable i as 1;
pre-selecting a number of iterations, n;
identifying at random a plurality of sets of parameters as initial sets of primary parameters;
mixing parameters from a copy of the sets of primary parameters to produce sets of mixed parameters;
for each set of primary parameters and each set of mixed parameters,
performing a sub-algorithm comprising:
setting a variable i' as 1;
pre-selecting a number of iterations, n'
setting a variable t as a random number between 0 and 1;
setting the set of primary parameters or mixed parameters as a set of starter parameters;
randomly perturbing a copy of the set of starter parameters to produce a set of perturbed parameters;
calculating a stack value for the set of starter parameters and a stack value for the set of perturbed parameters;
comparing the stack value for the set of perturbed parameters to the stack value for the set of starter parameters and, if the stack value for the perturbed parameters is higher or if a random number is less than t, replacing the set of starter parameters with the set of perturbed parameters selecting the parameters with the highest stack value as the new set of starter parameters; and
comparing i' to n' and if i' is less than n', adding 1 to i', varying t, and repeating the prior steps of the algorithm, or, if i' is not less than n', selecting the set of starter parameters as a set of intermediate parameters;
translating the parameters for each corresponding set of intermediate parameters into signed amplitudes at the surface;
applying an amplitude correction to corresponding traces;
aligning the corrected traces based on at least one position parameter;
summing the corrected traces to produce stack values corresponding to each set of intermediate parameters; and
comparing i to n and, if i is less than n, adding 1 to i and repeating the prior steps of the algorithm, or, if i is not less than n, selecting a final stack value by selecting the set of parameters with the highest stack value.

18. The method of claim 1, wherein the optimizing of the hydraulic fracturing includes determining a fault plane.

19. The system of claim 12, wherein, when optimizing the hydraulic fracturing, the computing unit determines a fault plane.

* * * * *